(12) United States Patent
Ohki et al.

(10) Patent No.: US 10,988,099 B2
(45) Date of Patent: Apr. 27, 2021

(54) COVER BODY FOR AIR-BAG DEVICE

(71) Applicant: NIHON PLAST CO., LTD., Fujinomiya (JP)

(72) Inventors: Takuya Ohki, Shizuoka (JP); Yohei Kiuchi, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 34 days.

(21) Appl. No.: 16/412,211

(22) Filed: May 14, 2019

(65) Prior Publication Data

US 2019/0351860 A1  Nov. 21, 2019

(30) Foreign Application Priority Data

May 16, 2018  (JP) .............. JP2018-094840

(51) Int. Cl.
| | | |
|---|---|---|
| *B60R 21/16* | (2006.01) | |
| *B60R 21/215* | (2011.01) | |
| *B60Q 3/20* | (2017.01) | |
| *B60R 21/203* | (2006.01) | |

(52) U.S. Cl.
CPC ........... *B60R 21/215* (2013.01); *B60Q 3/20* (2017.02); *B60R 21/203* (2013.01)

(58) Field of Classification Search
CPC ........ B60Q 3/283; B60Q 3/20; B60R 13/005; B60R 21/215; B60R 2021/21543; B60R 21/203
USPC .............................................. 280/728.3, 731
See application file for complete search history.

(56) References Cited

U.S. PATENT DOCUMENTS

| | | | | |
|---|---|---|---|---|
| 6,053,526 A | * | 4/2000 | Preisler | B60R 13/005 |
| | | | | 280/728.2 |
| 6,099,027 A | * | 8/2000 | Shirk | B60R 13/005 |
| | | | | 280/728.3 |
| 8,585,082 B2 | * | 11/2013 | Yamaji | B60Q 5/003 |
| | | | | 280/731 |
| 2006/0125217 A1 | * | 6/2006 | Nakamura | B60R 13/005 |
| | | | | 280/731 |
| 2007/0126216 A1 | * | 6/2007 | Nakamura | B60R 21/215 |
| | | | | 280/731 |
| 2009/0315306 A1 | * | 12/2009 | Worrell | B60R 21/21658 |
| | | | | 280/731 |
| 2011/0116251 A1 | * | 5/2011 | Rick | B60Q 3/68 |
| | | | | 362/84 |
| 2014/0210190 A1 | * | 7/2014 | Bosch | B60R 21/203 |
| | | | | 280/728.3 |

FOREIGN PATENT DOCUMENTS

JP  2017-226348 A  12/2017

* cited by examiner

*Primary Examiner* — Toan C To
(74) *Attorney, Agent, or Firm* — Procopio, Cory, Hargreaves & Savitch LLP

(57) ABSTRACT

A cover body of an air-bag device for covering an air bag includes a cover body part and an emblem attached to the front side of the cover body part. The emblem includes a planar light source, a light-transmissive panel covering the planar light source and a decoration component fixed to the cover body part to retain an outer circumferential part of the panel. The panel includes a panel part and an engagement part which is provided on the outer circumferential part of the panel part and engaged with the decoration component.

4 Claims, 5 Drawing Sheets

COVER BODY FOR AIR-BAG DEVICE

CROSS REFERENCE TO RELATED APPLICATION

The present application is based on, and claims priority from Japanese Patent Application No. 2018-094840, filed on May 16, 2018, the entire contents of which is incorporated herein by reference.

TECHNICAL FIELD

The disclosure relates to a cover body for an air-bag device where a decoration member is mounted on the front side of a cover body part.

BACKGROUND

For a vehicle such as an automobile, there has been known an air-bag device which is arranged in a vehicular fixing part, for example, a hub core of a steering wheel. Such a known air-bag device includes a bag-shaped air bag, an inflator for supplying the air bag with gas, and a cover body for covering the air bag in a non-deployed state and accommodating it therein. Then, when an external shock is applied to a vehicle (for example, an impact from a vehicle collision), the air bag inflates since gas is supplied from the inflator to the air bag. With the inflation of the air bag, the cover body is broken along break lines formed on the cover body beforehand (so-called "tear lines"), so that a plurality of door parts are formed. With development of these door parts about their respective hinge parts at the center of development, the air bang is developed to a passenger side to restrict a passenger for protection.

In the cover body for the known air-bag device, there is known a structure where an emblem (ornament) as the decoration member is mounted at the substantially-center part of the cover body part on the front side and additionally, this emblem is configured to emit light. In such a structure, the cover body includes a light source arranged on the front side of the cover body part and a light-transmissive emblem body (as the decoration body) for covering the light source. The emblem body is provided with a plurality of leg parts protruding to the rear side. In assembly, the emblem body is fixed to the cover body part since the leg parts passing through the cover body part are then engaged with the cover body part by heat welding. As the emblem must be maintained in its state fixed to the cover body part at the time of development of the air bag, a number of leg parts are provided on the whole area of the rear surface of the emblem body. Then, light of the light source is made incident on the inside of the emblem body, so that the emblem body emits light (refer to JP 2017-226348 A).

SUMMARY

In the cover body of the known air-bag device, however, as the plurality of leg parts are formed so as to protrude over the where area of the back surface of the emblem body, the light emission effect of the emblem body is easy to produce a positional difference between the positions of the leg parts and the circumferential positions of the leg parts, so that the uniformity in light emission of the emblem body cannot be obtained.

It is therefore an object of the present application to provide a cover body for an air-bag device, by which the uniformity in light emission of the decoration body can be obtained.

In order to attain the above object, a cover body of an air-bag device for covering an air bag according to one embodiment includes a cover body part and a decoration member attached to a front side of the cover body part. The decoration member includes a light source, a decoration body configured to cover the light source, the decoration body having light transmittance, and a retainer body fixed to the cover body part to retain an outer circumferential part of the decoration body. The decoration body includes a decoration part and an engagement part provided on an outer circumferential part of the decoration part and configured to engage with retainer body.

With this configuration, the retainer body is engaged with the engagement part provided on the outer circumferential part, so that the decoration body can be retained in the cover body part by the retainer body. Thus, as the decoration part of the decoration body does not require a retaining structure, the uniformity in light emission can be obtained at the decoration part of the decoration body.

The engagement part may include a first protruding part and a first groove part respectively provided on a front side of the engagement part. The retainer body may include a retainer part configured to overlap with the front side of the engagement part. The retainer part may include a second groove part configured to be fitting to the first protruding part and a second protruding part configured to be fitting to the first groove part.

With this configuration, since the engagement part of the decoration body and the retainer part of the retainer body are fitting to each other by recess-projection fitting, it is possible to maintain a state where the decoration body is retained in the cover body part reliably when the air bag is deployed.

The first protruding part and the second groove part, and the first groove part and the second protruding part may be respectively tapered fitting to each other.

Then, since the protruding part and the second groove part, and the first groove part and the second protruding part are respectively tapered fitting to each other, it is possible to firmly fix the retainer body and the decoration body in addition to the retainer body's pressing the decoration body against the cover body part, so that rattling of the decoration body and an occurrence of noise can be prevented.

The engagement part may be formed over the whole circumference of the outer circumferential part of the decoration part. The retainer body may be formed in an annular shape and also configured to be fitting to the engagement part over the whole circumference of the retainer body.

Then, since the annular retainer body is fitting to the engagement part of the decoration body over the whole circumference of the retainer body, a firm fixing structure can be established between the retainer body and the decoration body.

The decoration member may include a locking body disposed on the back side of the cover body part. Also, the retainer body may include a locking part which penetrates through the cover body part from the front side to the back side and which is locked to the locking body.

In this case, by allowing the locking part of the retainer body to penetrate through the cover body part and to be fitting to the locking body, it is possible to fix the decoration body, the light source and the cover body part while holding them between the retainer body and the locking body, thereby allowing the assembly workability to be improved.

DETAILED DESCRIPTION

A cover body of an air bag device according to a first embodiment will be described with reference to FIGS. 1 to 4.

Figure 4:
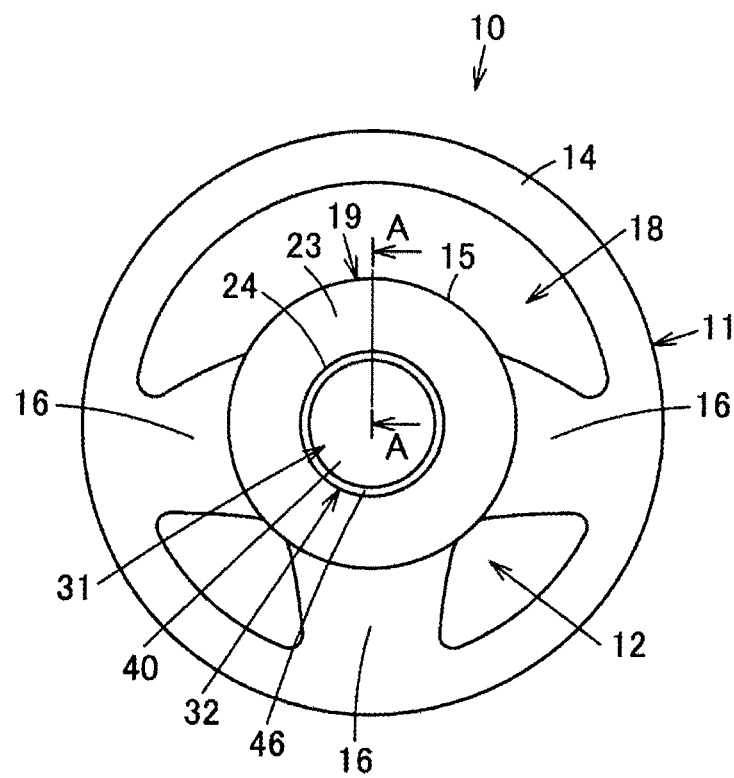
FIG. 4 is a front view of a steering wheel including the cover body according to the first embodiment.

FIG. 4 illustrates a steering wheel 10 of a vehicle. The steering wheel 10 includes a steering wheel body 11 and an air-bag device 12 mounted on a passenger side of the steering wheel body 11. Although the steering wheel 10 is normally mounted on a steering shaft (not illustrated) provided in the vehicle in an inclined state, the following explanation will be based on the assumption of regarding a steering-shaft side as "the back side", the passenger side as "the front side", and also regarding a direction toward an automobile windshield as "the upper side", with reference to the straight ahead state of the vehicle.

The steering wheel body 11 includes a rim part 14 as an annular gripping part, a boss part 15 arranged inside the rim part 14, and a plurality of spoke parts 16 connecting the rim part 14 with the boss part 15.

A substantially cylindrical boss (not illustrated) to be fitting to the steering shaft is provided on the back side of the boss part 15. Further, a boss plate (not illustrated) having its core body in the boss is integrally fixed to the boss by die-casting magnesium alloy or the like. A core metal of each spoke part 16 is integrally formed so as to extend from the boss plate. Alternatively, the core metal of the spoke part 16 may be fixed to the boss plate by welding or the like. Further, a core metal of the rim part 14 is also fixed to the core metals of the spoke parts 16 by welding or the like. On the outer circumferential part of the core metal of the rim part 14 and also the outer circumferential part of the core metal of each spoke part 16 on the side of the rim part 14, there is formed a skin part made of soft foamed polyurethane or the like. Further, the outer circumference of this skin part is partially or entirely covered with natural or artificial leather.

The air-bag device 12, which is also referred to as "air-bag module", is arranged so as to cover the front side of the boss part of the steering wheel body 11. The air-bag device 12 includes a base plate as a mounted member, which may be made from a metal plate or the like, a bag-like air bag and an inflator for injecting gas, and a cover body 18. The base plate of the air-bag device 12 is attached to the steering wheel body 11 through a horn plate or a bracket part. In the air-bag device 12, the air bag, the inflator, and the cover body 18 are attached to the base plate. The cover body 18 is configured so as to cover the air bag folded into a small shape.

Figure 1:
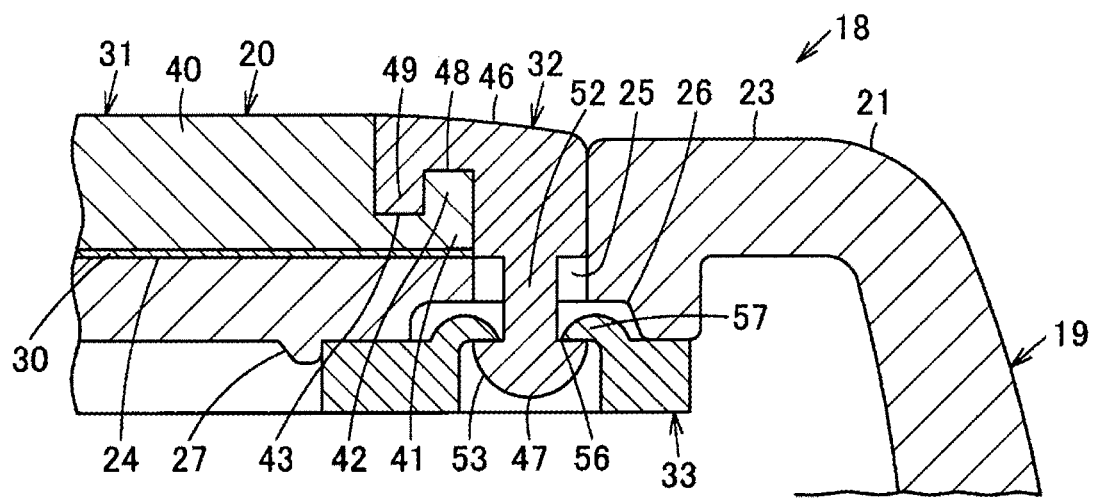
FIG. 1 is a cross-sectional view of a cover body of an air-bag device according to a first embodiment, taken along a line A-A of FIG. 4.
Figure 3:
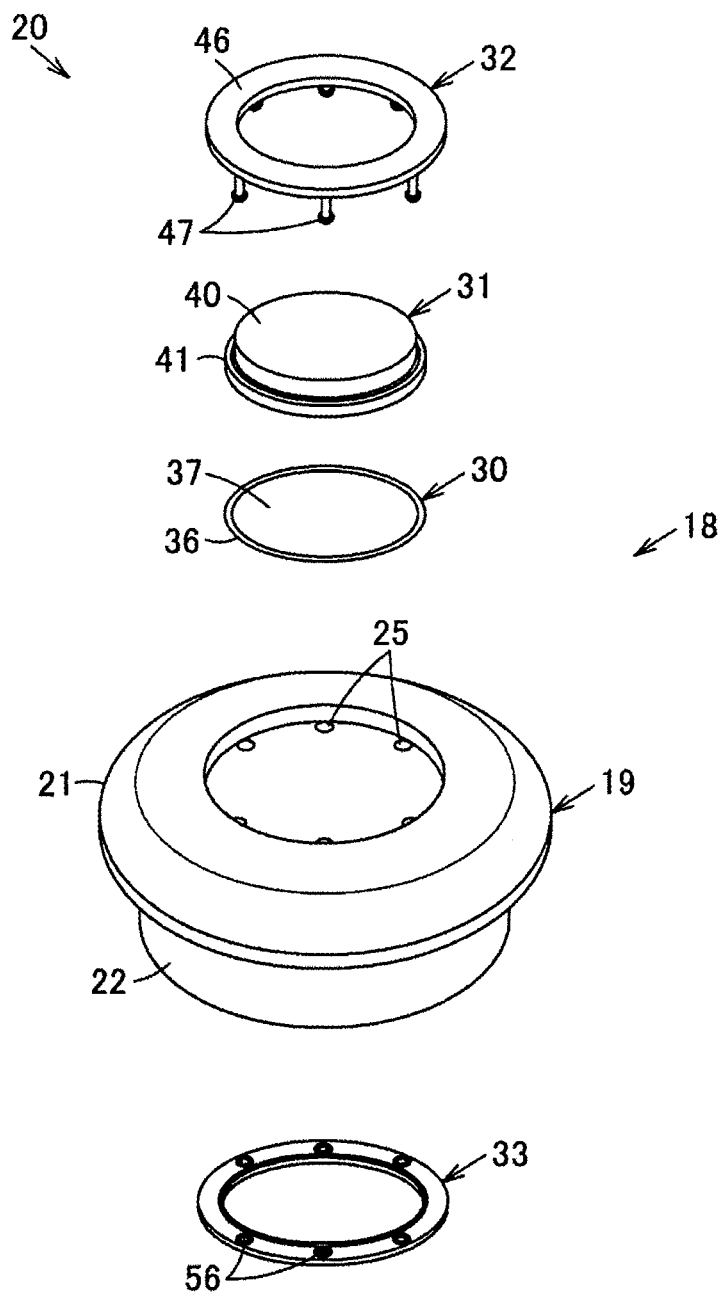
FIG. 3 is an exploded perspective view of the cover body according to the first embodiment.

As illustrated in FIGS. 1 and 3, the cover body 18, which is also called to as "casing body", "pad", or "module cover", includes a cover body part 19 integrally formed by soft synthetic resin, such as TPO (Thermoplastic Polyolefin), and an emblem 20 as a decoration member attached to the cover body part 19.

The cover body part 19 includes a cover part 21 which covers the boss part 15 and a part of each of the spoke parts 16 and a circumferential wall part 22 provided in a cylindrical shape so as to protrude from the back side (back surface side) of the cover part 21. An inner portion surrounded by the cover part 21 and the circumferential wall part 22 constitutes an air-bag accommodating part for accommodating the folded air bag. A portion of the cover part 21 facing the front side of the air-bag accommodating part constitutes a surface part 23 (see FIG. 1). At the center of the surface part 23 (on the front side constituting a design surface of the part 23), there is formed an attachment recess 24 in which the emblem 20 is accommodated.

On the back side of the cover part 21, a tear line (not illustrated) is formed at a position that faces the air-bag accommodating part and also avoids the attachment recess 24 of the surface part 23. With the tearing of the tear line, a plurality of door parts is formed when the air bag is deployed. The tear line, which may be referred to as "planned line part", "predetermined breaking part", or the like, is constituted by a groove on the back side of the surface part 23 and also formed as a fragile part that is weaker than the other portions of the surface part 23. The tear line may be established arbitrarily according to the desired number of the door parts and their shapes. In the first embodiment, for example, the tear line includes a central tear part that extends from one side part of the attachment recess 24 to the other side part through its lower part continuously while crossing the air-bag accommodating space of the surface part 23 and four outer circumferential tear parts that extend from left and right ends of the central tear part (as starting points) along the peripheral part of the air-bag accommodating space of the surface part 23 respectively up and down with respect to the starting points. The outer circumferential tear parts extending along the periphery of the air-bag accommodating space of the surface part 23 (also extending toward the 12:00 and 6:00 positions in the circumference) are formed so as to terminate at predetermined positions in front of the 12:00 and 6:00 positions. Consequently, there are remained two circumferential portions about the 12:00 and 6:00 positions, each of which has a specified width including no outer circumferential tear part. In the first embodiment, such remained circumferential portions provide hinge parts for supporting two door parts when the air bang is developed. In these door parts, that is, one door part containing the emblem 20 is configured so as to upward open about the hinge part including an upper portion of the attachment recess 24 of the surface part 23, while the other door part containing no emblem is configured so as to downward open about the hinge part including an lower portion of the attachment recess 24.

The circumferential wall part 22 is provided with an engagement structure (not illustrated) such as engagement claw parts and engagement opening parts for engaging the base plate with the cover body 18.

The attachment recess 24 is formed into an almost complementary shape with respect to the emblem 20. In the cover body 18 according to the first embodiment, the attachment recess 24 is substantially-circular shaped in front view. The attachment recess 24 is formed with a plurality of insertion holes 25 for attaching the emblem 20 and a wiring hole (not illustrated). The plurality of insertion holes 25 is formed at respective positions of an outer circumferential part of the attachment recess 24. For example, the insertion holes 25 are formed at regular intervals along the circumferential direction of the attachment recess 24. The insertion hole 25 in the form of a circular hole is formed so as to penetrate through the attachment recess 24 in the front-rear direction identical to the thickness direction of the cover body 18. In the outer circumferential part of the attachment recess 24, the wiring hole (not illustrated) is formed, for example, on the lower side of the attachment recess 24 so as to penetrate through the attachment recess 24 in the front-rear direction identical to the thickness direction of the cover body 18. On the back side of the outer circumferential part of the attachment recess 24, a circular depressed part 26 is formed so as to surround each insertion hole 25 and additionally, a positioning protrusion 27 is formed on the inner circumferential side of the circular depressed part 26. The positioning protrusion 27 may be formed in the circumferential direction annularly. Alternatively, there may be provided a plurality of positioning protrusions 27 protruding at several positions in the circumferential direction.

As illustrated in FIGS. 1 and 3, the emblem 20 (also referred to as "ornament") includes a planar light source 30 as a light source, a panel 31 as a decoration body covering the planar light source 30, a decoration component 32 as a retainer body for allowing the cover body part 19 to retain the panel 31, and a clip 33 as a locking body for locking the decoration component 32 to the cover body part 19. The emblem 20 is fixed to the cover body part 19 under conditions that: the planar light source 30, the panel 31, and the decoration component 32 are disposed in the attachment recess 24 of the cover body part 19; the clip 33 is disposed on the back side of the cover body part 19; and the panel 31, the planar light source 30, and the surface part 23 of the cover body part 19 are held between the decoration component 32 and the clip 33.

The planar light source 30 is formed by, for example, an organic EL substrate in which an organic EL element is mounted on the surface of a substrate 36 to form one light emitting surface 37 in the form of a continuous plane. Alternatively, the planar light source 30 may include, for example, an LED and a light-guide plate which guides light from the LED and injects the light from the surface of the light-guide plate. Further, the planar light source 30 is formed in a disc shape that allows it to be disposed in the attachment recess 24. The planar light source 30 is disposed inside the outer circumferential part of the attachment recess 24 where the insertion holes 25 are formed, and is secured in the attachment recess 24 while being held between the cover body part 19 and the panel 31. A feed cable (not illustrated) is connected to the substrate 36. Through the wiring hole of the attachment recess 24, the feed cable is connected to a feed connector or the like disposed in the boss part 15.

By using synthetic resin having light transmittance, such as polymethyl methacrylate (PMMA) or polycarbonate (PC), the panel 31 is also formed in a disk shape that allows it to be disposed in the attachment recess 24. The panel 31 includes a panel part 40 as a decoration part and an engagement part 41 provided on an outer circumferential part of the panel part 40.

The panel part 40 of the panel 31 is formed in a disk shape. The front side (surface side) of the panel part 40 is constituted by a smooth surface without irregularities and also formed in a convex curved shape so that the center may protrude. The back surface side of the panel part 40 is constituted by a smooth surface without irregularities and also formed in a planar shape. Also, the back side of the panel part 40 is formed in a planar shape continuous to the back side of the engaging part 41. The front side of the panel part 40 is surface-treated appropriately. For example, a film having light transmissivity is stuck to the front side of the panel part 40. The film (e.g. half mirror film where a metal thin film is formed corresponding to the shape of an emblem design or logo) is configured so as to reflect light incident on the metal thin film from the outside and transmit light incident from the planar light source 30. The panel part 40 may be provided, on the back side, with an accommodation recessed part for accommodating the planar light source 30.

Figure 2:
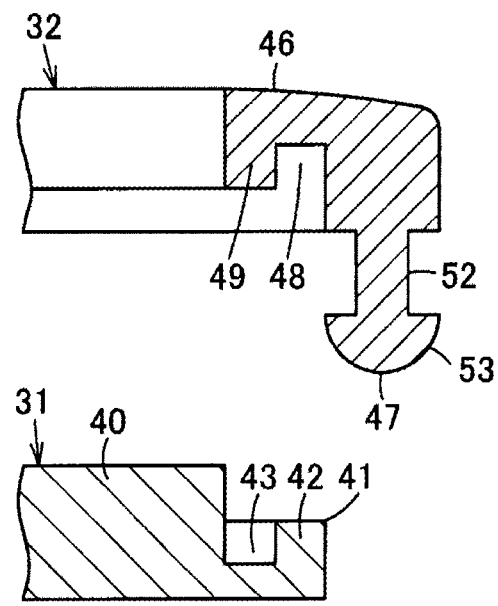
FIG. 2 is a cross-sectional view of a decoration body and a retainer body of the cover body according to the first embodiment, in an exploded state.

The engaging part 41 is annularly formed over the entire circumference of the panel part 40. As illustrated in FIGS. 1 and 2, the engagement part 41 includes an engagement-side protruding part 42 which is positioned at the outermost circumferential portion of the engagement part 41a to protrude to the front side and an engagement-side groove part 43 which is positioned on the inner circumferential side of the engagement-side protruding part 42 and between the engagement-side protruding part 42 and the panel part 40 in a groove shape. The engagement-side protruding part 42 and the engagement-side groove part 43 are annularly formed over the entire circumference of the engagement part 41.

By using synthetic resin such as polyester-based elastomer, the decoration component 32 is also formed in an annular shape that allows it to be disposed in the attachment recess 24. The decoration component 32 includes an annular retainer part 46 and a plurality of locking parts 47 protruding from the back side of the retainer part 46. A decoration is applied at least on the front side of the retainer part 46. In the decoration, there is contained, for example, any of piano-black coating, metallic coating, gentle and high-class impressive plating, wood-grain fluid printing, carbon composite pattern film insert molding, and the like.

In assembly, since the retainer part 46 is engaged with the panel 31 while the inner circumferential portion of the retainer part 46 and the front side of the engagement part 41 of the panel 31 are overlapping with each other, the panel 31 is arranged in position and also retained in the attachment recess 24 of the cover body part 19. As illustrated in FIGS. 1 and 2, the retainer part 46 includes a retainer-side groove part 48 provided in the form of a groove on the back side of the retainer part 46 and a retainer-side protruding part 49 arranged on the inner circumferential side of the retainer-side groove part 48 to protrude to the back side at the innermost circumferential portion. The retainer-side groove part 48 and the retainer-side protruding part 49 are annularly formed over the entire circumference of the retainer part 46. Then, by overlapping the back side of the retainer part 46 on the front side of the engagement part 41 of the panel 31, the retainer-side groove part 48 is fitting to the engagement-side protruding part 42 and additionally, the retainer-side protruding part 49 is fitting to the engagement-side groove part 43. The retainer-side groove part 48 and the retainer-side protruding part 49 are fitting to the engagement-side protruding part 42 and the engagement-side groove part 43 over the entire circumference, respectively. Further, the surface of the retainer part 46 is formed in a convexly-curved surface-like shape or planner shape so as to provide a surface that is continuous to the front side of the panel part 40 of the panel 31 without producing any step under condition that the engagement part 41 of the panel 31 and the retainer part 46 of the decoration component 32 are fitting to each other.

The cover 18 may include a positioning structure for determining the circumferential position of the panel 31 and the decoration component 32. As the positioning structure, for example, the panel 31 and the decoration component 32 may be provided with another recess-projection fitting structure different from the engagement-side protruding part 42, the engagement-side groove part 43, the retainer-side groove part 48, and the retainer-side protruding part 49.

The locking parts 47 of the decoration component 32 are formed so as to protrude from the back side of the retainer part 46 at respective positions corresponding to the positions of the insertion holes 25 in the attachment recess 24 of the cover body part 19. As illustrated in FIGS. 1 and 2, each of the locking parts 47 includes a cylindrical part 52 and a locking claw part 53 arranged at a tip of the cylindrical part 52 to have a larger diameter than that of the part 52 thereby producing a step. The locking parts 47 can be inserted into the insertion holes 25 of the attachment recess 24, so that the locking claw parts 53 are locked to the clip 33 disposed on the back side of the cover body part 19.

The clip 33, also called to as "lower emblem", is formed annularly by injection molding of synthetic resin such as ABS (acrylonitrile butadiene styrene). As illustrated in FIGS. 1 and 3, the clip 33 includes a plurality of locking holes 56 into which the locking parts 47 of the decoration component 32 are fitting under pressure, and a plurality of locking receiving parts 57 for locking the locking claw parts 53 of the locking parts 47 press-fitting into the locking holes 56. Each of the locking receiving parts 57 is formed thinner than the thickness (in the front-rear direction) of other clip portions other than the locking receiving part 57. Also, the locking receiving part 57 is bent and formed so as to protrude to the front side. Each of the locking holes 56 is formed at the center of the respective locking receiving parts 57. The clip 33 is positioned and arranged on the back side of the cover body part 19 under condition that the inner circumferential part of the clip 33 is engaged with an outer circumference of the positioning protrusion 27. The lock receiving parts 57 of the clip 33 are disposed in the depressed parts 26 of the cover body part 19 to lock the locking claw parts 53 of the locking parts 47, which are inserted into the insertion holes 25 of the cover body part 19 and then press-fitting into the locking holes 56.

When manufacturing the cover body 18, the cover body part 19 including the cover part 21 and the circumferential wall part 22 is injection molded by using synthetic resin in advance. After this injection molding, the planar light source 30, the panel 31, and the decoration component 32 are assembled into the attachment recess 24 of the cover body part 19 in order. At this time, the engagement part 41 of the panel 31 and the retainer part 46 of the decoration component 32 are fitting to each other into one body. In detail, the engagement-side protruding part 42 and the engagement-side groove part 43 of the engagement part 41 are fitting to the retainer-side groove part 48 and the retainer-side protruding part 49 of the retainer part 46 respectively, so that the engagement part 41 is integrated with the retainer part 46.

Additionally, the locking parts 47 of the decoration component 32 are inserted into the insertion holes 25 of the attachment recess 24.

Under a condition that the clip 33 is disposed on the back side of the cover body part 19, respective tip sides (including the locking claw part 53) of the locking parts 47 protruding from the insertion holes 25 are press-fitting into the locking holes 56 of the clip 33. On penetrating through the locking holes 56, each of the locking claw parts 53 is locked to the back side of the respective locking receiving parts 57.

As a result, the emblem 20 is fixed to the cover body part 19 firmly under the condition that the panel 31, the planar light source 30, and the cover body part 19 are held between the decoration component 32 and the clip 33. Furthermore, in this state, the planar light source 30, the panel 31, and the decoration component 32 of the emblem 20 are accommodated in the attachment recess 24, thereby providing a nearly flash state where the emblem 20 does not protrude from the front side of the surface part 23 around the attachment recess 24 greatly.

In operation, when an automobile with the steering wheel 10 having the air-bag device 12 including the cover body 18 collides with a vehicle or the like, the control device operates the inflator to supply the air bag with gas. Then, the air bag inflates and deploys rapidly. With a pressure by this inflation and deployment of the air bag, the cover body 18 is broken along the tear line to form the door parts. Then, the so-formed door parts pivot about the hinge parts and form an opening (projection port) allowing the air bag to be bulged outward. Then, in front of a passenger, the air bag is deployed through the projection port to protect the passenger.

In the automobile with the steering wheel 10 having the airbag device 12 including the cover body 18, when external light is incident on a metal membrane of the film on the front side of the panel part 40 of the panel 31, an emblem design or the like becomes visible in a state of being reflected on the metal membrane. Further, when the planar light source 30 emits light, the light from the light emitting surface 37 of the planar light source 30 is incident on the panel part 40 of the panel 31. Then, the light is transmitted through the panel part 40 and emitted from its front side. During this flow of the light, since the panel part 40 is provided, on its both sides (front side and back side), with a smooth surface without irregularities, the light is uniformly transmitted through the entire panel part 40, thereby providing uniformity of light emission over the entire panel part 40. Furthermore, the emblem design and the like can be seen by the metal membrane of the film.

According to the embodiment, the panel part 40 is provided, on the back side, with no engagement protrusion for attaching the panel part 40 to the cover body 18. Also in the planar light source 30 to be combined with panel part 40, there is no need of forming a through-hole for the engagement protrusion in the light emitting surface 37. Consequently, since the planar light source 30 does not produce an island-shaped non-emitting portion in the light emitting surface 37, the panel part 40 can be made to emit light uniformly and additionally, the manufacturing cost can be saved since it is advantageous in the processing easiness and yield (manufacturing field).

Thus, according to the cover body 18 of the first embodiment, since the decoration component 32 is engaged with the engagement part 41 provided on the outer circumferential part of the panel part 40 of the panel 31 so that the panel 31 can be retained in cover body part 19 by the decoration component 32, it becomes unnecessary to provide retaining structures on the front and back sides of the panel 40 (in the light transmitting direction) and additionally, it becomes possible to construct the front and back sides of the panel 40 by smooth surfaces. As a result, as the light from the planar light source 30 is transmitted through the entire panel part 40 uniformly, the uniformity of light emission over the whole panel unit 40 can be accomplished.

In addition, since the engagement part 41 of the panel 31 and the retainer part 46 of the decoration component 32 are engaged with each other by recess-projection fitting, it is possible to maintain a state where the panel 31 is retained in the cover body part 19 reliably, when deploying the air bag.

Moreover, since the engagement part 41 formed over the whole circumference of the panel 31 is fitting to the annular decoration component 32 over its whole circumference, the panel 31 can be firmly fixed to the cover body 18 by the decoration component 32. At the same time, light becomes hard to leak to the outer circumference of the panel 31.

Further, by locking the locking parts 47 of the decoration component 32 to the clip 33 through the cover body part 19, it is possible to hold the panel 31, the planar light source 30, and the cover body part 19 between the decoration component 32 and the clip 33. That is, since the panel 31, the planar light source 30 and the cover body part 19 can be fixed with each other by one-touch operation. Thus it is possible to improve the assembly workability of the air-bag device 12.

Next, a second embodiment will be described with reference to FIG. 5. Thereafter, a third embodiment will be described with reference to FIG. 6. In these embodiments, the same elements (and the same operations) as those of the first embodiment will be indicated with the same reference numerals respectively, and their descriptions will be omitted.

Figure 5:
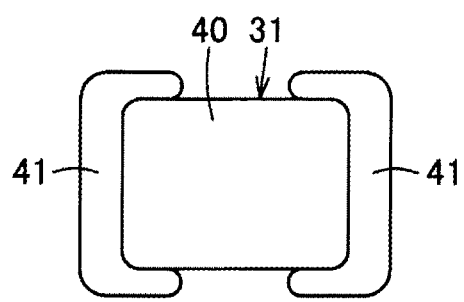
FIG. 5 is a front view of a decoration body of a cover body according to a second embodiment.
Figure 6:
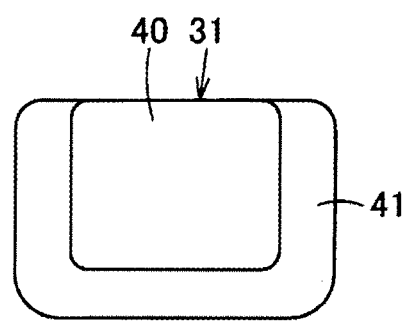
FIG. 6 is a front view of a decoration body of a cover body according to a third embodiment.

As illustrated in FIG. 5 or FIG. 6, the panel part 40 of the panel 31 may be formed in a substantially square shape. Alternatively, the panel part 40 may be formed in any of an oval, a rhombus, a triangle, and the other shapes.

The engagement part 41 of the panel 31 may be provided on the whole circumference of the panel part 40 regardless of the shape of the panel part 40. Nevertheless, as illustrated FIG. 5, the engagement part 41 may be provided only on both sides of the panel part 40. Alternatively, as illustrated in FIG. 6, the engagement part 41 may be provided in an outer circumferential area other than the upper area of the panel part 40.

Figure 7:
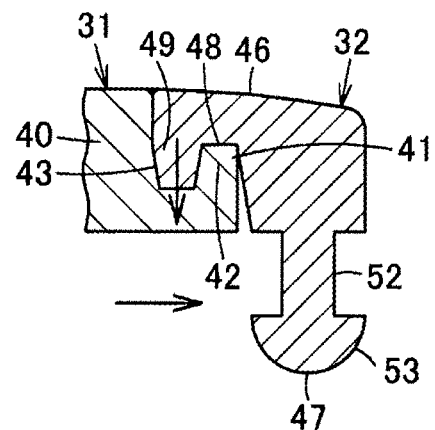
FIG. 7 is a cross-sectional view of a decoration body and a retainer body of the cover body according to a fourth embodiment in an engaged state.

Next, a fourth embodiment will be described with reference to FIG. 7. Also in the fourth embodiment, the same elements (and the same operations) as those of the first embodiment will be indicated with the same reference numerals respectively, and their descriptions will be omitted.

The engagement-side protruding part 42 and the retainer-side groove part 48, and the engagement-side groove part 43 and the retainer-side protruding part 49 are formed so as to be tapered fitting to each other. That is, in the engagement-side protruding part 42 and the retainer-side protruding part 49, their outside surfaces are tapered so that respective widths on the proximal-end side are widened, while respective widths on the distal-end side are narrowed. Also, in the engagement-side groove part 43 and the retainer-side groove part 48, their inside surfaces are tapered so that respective widths on the groove-back side are narrowed, while respective widths on the opening side are widened. In the fourth embodiment, the outside surface (on the inner circumferential side) of the engagement-side protruding part 42 is formed so as to have a tapered surface, and both inside surfaces (on the inner/outer circumferential sides) of the engagement-side groove part 43 are formed so as to have tapered surfaces. Further, both outside surfaces (on the inner/outer circumferential sides) of the retainer-side protruding part 49 are formed so as to have tapered surfaces, and the inside surface on the inner circumferential side of the retainer-side groove part 48 is formed so as to have a tapered surface.

In operation, since the engagement-side protruding part 42 and the retainer-side groove part 48, and the engagement-side groove part 43 and the retainer-side protruding part 49 are tapered fitting to each other respectively, the panel 31 is pulled in the outer-diameter direction (or pushed in the inner-diameter direction) by a force of the decoration component 32 to press the panel 31 against the cover body part 19. As a result, as the panel 31 and the decoration component 32 are firmly fixed with each other by recess-projection fitting, it is possible to prevent rattling of the panel 31 and an occurrence of noise.

Figure 8:
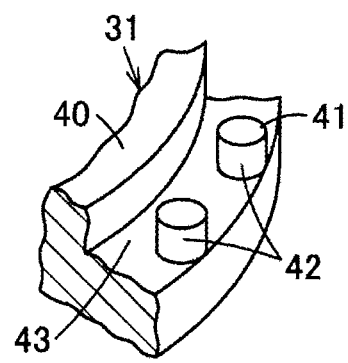
FIG. 8 is a perspective view of an engaged part of a decoration body of a cover body according to a fifth embodiment.

Next, a fifth embodiment will be described with reference to FIG. 8. Also in the fifth embodiment, the same elements (and the same operations) as those of the first embodiment will be indicated with the same reference numerals respectively, and their descriptions will be omitted.

The engagement-side protruding part 42 provided in the engagement part 41 of the panel 31 may include a plurality of protrusions along the engagement part 41. For example, although the engagement-side protruding part 42 is formed in a cylindrical shape, it may be formed in a substantially-oval shape or the like, which is elongated along the engagement part 41. In this case, a panel portion between the plurality of engagement-side protruding parts 42 and the panel part 40, and a panel portion between the adjacent engagement-side protruding part 42, etc., constitute the engagement-side groove part 43.

Corresponding to the engagement part 41 of the panel 31, the retainer-side groove part 48 of the retainer part 46 of the decoration component 32 may include a plurality of recesses for engagement with the plurality of engagement-side protruding parts 42 of the engagement part 41. In this case, on the back side of the retainer part 46, a retainer portion other than the recesses constituting the retainer-side groove part 48 constitutes the retainer-side protruding part 49.

With this configuration, by recess-projection fitting between the engagement part 41 of the panel 31 and the retainer part 46 of the decoration component 32, it is possible to position and retain the panel 31 and the decoration component 32 in the circumferential direction.

Besides, the retainer-side groove part 48 of the retainer part 46 of the decoration component 32 may be formed by a single groove extending along the retainer part 46 continuously. In this case, the retainer-side groove part 48 is configured so as to be fittable to the plurality of engagement-side protruding parts 42.

Figure 9:
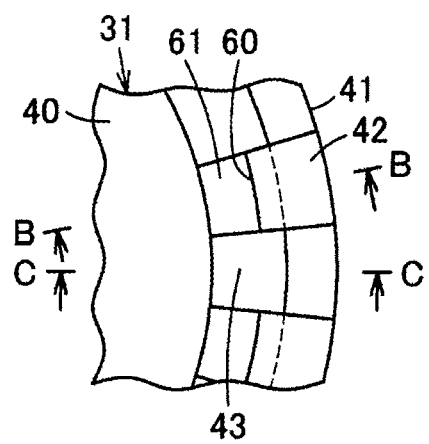
FIG. 9 is a front view of a part of a decoration body of a cover body according to a sixth embodiment.
Figure 10:
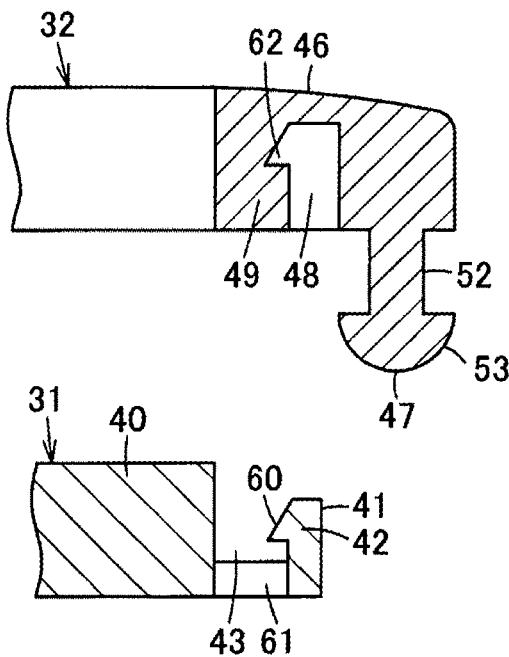
FIG. 10 is a cross-sectional view of the decoration body and a retainer body of the cover body according to the sixth embodiment, taken along a line B-B of FIG. 9.
Figure 11:
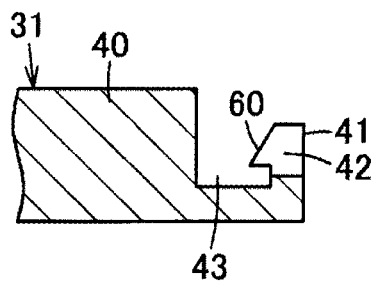
FIG. 11 is a cross-sectional view of the decoration body of the cover body according to the sixth embodiment, taken along a line C-C of FIG. 9.

Next, a sixth embodiment will be described with reference to FIGS. 9 to 11. Also in the sixth embodiment, the same elements (and the same operations) as those of the first embodiment will be indicated with the same reference numerals respectively and their descriptions will be omitted.

The engagement-side protruding part 42 provided in the engagement part 41 of the panel 31 includes a plurality of protrusions (protruding parts) divided along the engagement part 41. An engagement claw part 60 is formed so as to protrude from the inner circumferential surface (on the tip side) of each engagement-side protruding part 42. Between the base side of each engagement-side protruding part 42 and the panel portion 40, an opening 61 for molding the engagement claw part 60 is formed so as to penetrate in the front-rear direction.

Corresponding to the engagement part 41 of the panel 31, the retainer-side protruding part 49 of the retainer part 46 of the decoration component 32 includes an engagement receiving part 62 with which the engagement claw parts 60 engage under condition that the retainer part 46 is fitting to the engagement part 41 of the panel 31 by recess-projection fitting. In connection, the retainer-side protruding part 49 may be divided into a plurality of portions along the retainer part 46, or may be formed so as to extend along the retainer part 46 continuously.

With this configuration, the panel 31 and the decoration component 32 can be integrated by combining them with each other. Thus, it is possible to enhance the connection between the panel 31 and the decoration component 32 and also possible to improve the assemblability.

Figure 12:
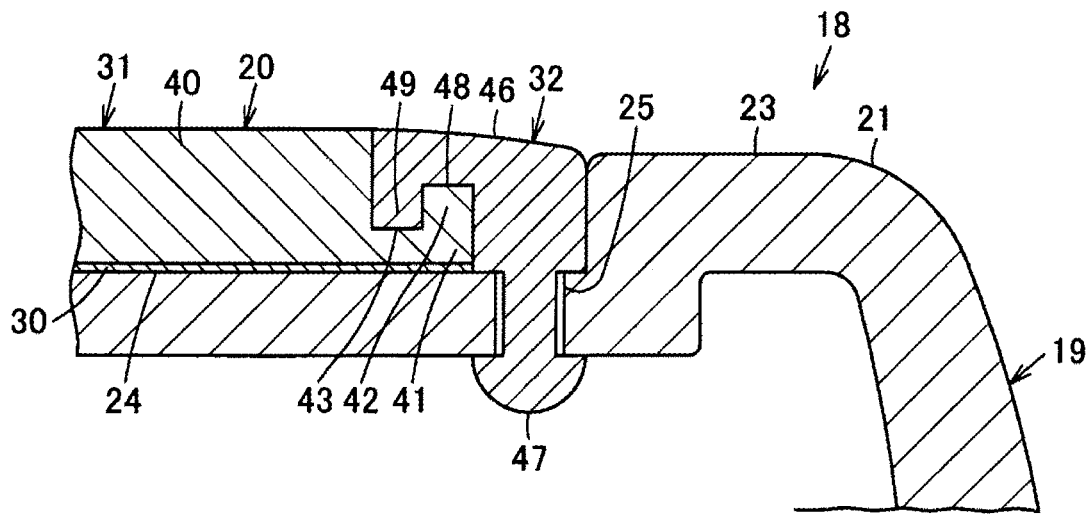
FIG. 12 is a cross-sectional view of a cover body according to a seventh embodiment, corresponding to the view taken along the line A-A of FIG. 4.

Next, a seventh embodiment will be described with reference to FIG. 12. Also in the seventh embodiment, the same elements (and the same operations) as those of the first embodiment will be indicated with the same reference numerals respectively and their descriptions will be omitted.

The locking part 47 of the decoration component 32 may be fixed to the back side of the cover body part 19 by welding.

With this configuration, it is possible to omit the clip 33 and the number of components can be reduced.

In common with the above-mentioned embodiments, either one of the engagement part 41 of the panel 31 and the retainer part 46 of the decoration component 32 may be provided with a protruding part only, providing that the other of the engagement part 41 and the retainer part 46 is provided with a groove part only so that the protruding part and the groove part are fitting to each other by recess-projection fitting.

Moreover, although it is preferable that the engaging part 41 of the panel 31 and the retained part 46 of the decoration component 32 are fitting to each other by recess-projection fitting, the engaging part 41 and the retained part 46 may be simply engaged with each other without being fitting by recess-projection fitting.

In each embodiment, the cover body part 19 is provided with the attachment recess 24 in which the emblem 20 is to be disposed. However, when the air-bag device 12 is configured so that the emblem 20 protrudes from the cover body part 19, the attachment recess 24 is not required in this case.

Additionally, the air-bag device 12 may be constructed so as to also serve as, for example, an operation unit of a horn switch.

Finally, it should be noted that the shape of the cover body 18 may be modified arbitrarily in accordance with the shape of the steering wheel 10 and the like.

What is claimed is:

1. A cover body of an air-bag device for covering an air bag, comprising:
    a cover body part; and
    a decoration member attached to a front side of the cover body part, wherein
    the decoration member includes:
        a light source;
        a decoration body configured to cover the light source, the decoration body having light transmittance; and
        a retainer body fixed to the cover body part to retain an outer circumferential part of the decoration body, wherein
    the decoration body includes:
        a decoration part; and
        an engagement part provided on an outer circumferential part of the decoration part and configured to engage with retainer body, and
    wherein the engagement part includes a first protruding part and a first groove part respectively provided on a front side of the engagement part,
    the retainer body includes a retainer part configured to overlap with the front side of the engagement part, and
    the retainer part includes a second groove part configured to be fitting to the first protruding part and a second protruding part configured to be fitting to the first groove part.

2. The cover body of claim 1, wherein
    the first protruding part and the second groove part, and the first groove part and the second protruding part are respectively configured to be tapered fitting to each other.

3. The cover body of claim 1, wherein
    the engagement part is formed over a whole circumference of the outer circumferential part of the decoration part, and
    the retainer body is formed in an annular shape and also configured to be fitting to the engagement part over the whole circumference of the retainer body.

4. The cover body of claim 1, wherein
    the decoration member includes a locking body disposed on a back side of the cover body part, and
    the retainer body includes a locking part configured to penetrate through the cover body part from the front side to the back side and to be locked to the locking body.

* * * * *